US006298238B1

(12) United States Patent
Dai (10) Patent No.: US 6,298,238 B1
(45) Date of Patent: Oct. 2, 2001

(54) FAST USER TERMINAL POSITION DETERMINATION IN A SATELLITE COMMUNICATIONS SYSTEM

(75) Inventor: Jin Dai, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/150,077

(22) Filed: Sep. 9, 1998

(51) Int. Cl.[7] ............................... G01S 5/02; H04B 7/185
(52) U.S. Cl. ..................... 455/456; 455/12.1; 455/456; 342/357.01; 342/357.05
(58) Field of Search ................... 455/12.1, 13.2, 455/456; 342/357, 357.01, 357.06, 357.08, 357.05

(56) References Cited

U.S. PATENT DOCUMENTS

| | | | |
|---|---|---|---|
| 3,795,911 | * 3/1974 | Hammack | 455/12.1 |
| 4,445,118 | 4/1984 | Taylor et al. | 343/357 |
| 4,797,677 | 1/1989 | MacDoran | 342/352 |
| 4,819,053 | 4/1989 | Halavais | 342/353 |
| 4,987,420 | 1/1991 | Inamiya | 342/457 |
| 5,105,198 | 4/1992 | Inamiya | 342/457 |
| 5,126,748 | 6/1992 | Ames et al. | 342/353 |
| 5,319,308 | 6/1994 | Dechene et al. | 324/307 |
| 5,412,388 | 5/1995 | Attwood | 342/357 |
| 5,412,389 | 5/1995 | Olds | 342/357 |
| 5,420,592 | 5/1995 | Johnson | 342/357 |
| 5,500,648 | 3/1996 | Maine et al. | 342/357 |
| 5,543,813 | 8/1996 | Araki et al. | 342/357 |
| 5,548,801 | 8/1996 | Araki et al. | 455/13.1 |
| 5,552,794 | * 9/1996 | Colley et al. | 342/357 |
| 5,552,795 | 9/1996 | Tayloe | 342/357 |
| 5,557,284 | 9/1996 | Hartman | 342/357 |
| 5,617,317 | 4/1997 | Ignagni | 364/449.9 |
| 5,619,525 | 4/1997 | Wiedeman et al. | 375/200 |
| 5,634,190 | 5/1997 | Wiedeman | 455/13.1 |
| 5,732,387 | * 3/1998 | Armbruster et al. | 455/12.1 |

FOREIGN PATENT DOCUMENTS

| | | | |
|---|---|---|---|
| 0546758 | 6/1993 | (EP) | H04Q/7/04 |
| 0582073 | 2/1994 | (EP) | G01S/5/02 |
| 8801392 | 2/1988 | (WO) | G01S/13/78 |
| 9621162 | 7/1996 | (WO) | G01S/5/02 |
| 9814795 | 4/1998 | (WO) | G01S/5/12 |
| 9814797 | 4/1998 | (WO) | G01S/5/12 |

OTHER PUBLICATIONS

Nadav Levanon; Quick Position Determination Using 1 or 2 LEO Satellites; Jul. 1998; IEEE Transactions on Aerospace and Electronic Systems; vol. 34; No. 3; pp. 736–754.

* cited by examiner

Primary Examiner—Lee Nguyen
Assistant Examiner—Simon Nguyen
(74) Attorney, Agent, or Firm—Phillip R. Wadsworth; Gregory D. Ogrod (57) ABSTRACT

An apparatus, method, and process for quickly and accurately determining the position of a user terminal in a satellite communications system. An initial coarse estimate of the radius of the Earth at a terminal position is made. The geometry of satellites being used and the user terminal is then determined. When only one satellite is used, the satellite-user terminal geometry includes the range and range rate of the satellite with respect to the user terminal. When two satellites are used, the satellite-user terminal geometry includes the range of each satellite with respect to the user terminal. An initial position estimate is determined based on the radius and the satellite-user terminal geometry. The coarse radius estimate can then be formed into a fine estimate and the initial position estimate further refined.

24 Claims, 7 Drawing Sheets

FAST USER TERMINAL POSITION DETERMINATION IN A SATELLITE COMMUNICATIONS SYSTEM

BACKGROUND OF THE INVENTION

1. Field of the Invention

The present invention relates generally to satellite communication systems and networks. More particularly, the present invention relates to quickly and accurately determining the position of a user terminal in a satellite communications system.

2. Related Art

A typical satellite-based communications system comprises at least one terrestrial base station (hereinafter referred to as a gateway), at least one user terminal (for example, a mobile telephone), and at least one satellite for relaying communications signals between the gateway and the user terminal. The gateway provides links from a user terminal to other user terminals or communications systems, such as a terrestrial telephone system.

While the advent of the wireless user terminal has freed users to take their phones wherever they go, it has also imposed upon the satellite communications carrier the burden of determining the location of the user terminal. The need for user terminal position information stems from several considerations. One consideration is that the system should select an appropriate gateway for providing the communications link. One aspect of this consideration is allocation of a communications link to the proper service provider (for example, a telephone company). A service provider is typically assigned a particular geographic territory, and handles all communication links or calls with users in that territory. When communications are required with a particular user terminal, the communications system can allocate the call to a service provider based on the territory within which the user terminal is located, at the time. In order to determine the appropriate territory, the communications system requires the position of the user terminal. A similar consideration arises when calls must be allocated to service providers based on political boundaries or contractual relationships.

Several methods of determining the location of the user terminal involve measuring the distance (range) between the user terminal and the satellite and the rate of change of that distance (range rate). When these measurements are combined with other data, such as the position of the satellite, the location of the user terminal can be determined with great precision. Techniques for determining user terminal location using satellite-user terminal range and range rate are disclosed in commonly-owned, copending U.S. patent applications entitled "Position Determination Using One Low-Earth Orbit Satellite," Ser. No. 08/723,751; and "Unambiguous Position Determination Using Two Low-Earth Orbit Satellites," Ser. No. 08/723,725, which are incorporated by reference herein in their entirety.

Once the range and range rate quantities are known, they can be combined with the known position and velocity of the satellite to generate a set of non-linear equations that cannot be solved exactly. According to conventional methods, a solution to these equations is obtained by using a numerical approach, such as the well-known iterative Newton-Raphson method.

One disadvantage of this approach is that such iterative numerical approaches require significant time and computational resources to execute. A crucial requirement in position determination for a satellite-based communications system is speed. When communications are required with a particular user terminal, the position of the user terminal should be selected rapidly. Since user terminal position is used as part of the process of establishing service, delays in determining position result in undesirable delays in establishing service. A mobile terminal user is not likely to tolerate a delay of more than a few seconds when placing a call or setting up a communications link.

SUMMARY OF THE INVENTION

The present invention comprises an apparatus and method for rapidly determining the position of a user terminal in a satellite communications system based on the distances (ranges) between the user terminal and one or more satellites, the rate of change of those distances (range rates), and the positions and velocities of the satellites.

In one embodiment, a single satellite is used to determine the position of the user terminal. In this embodiment, the method includes the steps of estimating the radius of the Earth at a user terminal initial position estimate to produce a coarse radius estimate; determining the distance between the user terminal and a satellite and the rate of change of that distance; and determining a coarse position estimate based on the coarse radius estimate, the distance, and the rate of change of the distance.

In this embodiment, the coarse position estimate can be improved using either of two methods. One method includes the steps of updating the coarse radius estimate using the coarse position estimate to produce a fine radius estimate, and then updating the coarse position estimate based on the fine radius estimate, the distance, and the rate of change of the distance to produce a fine position estimate for the user terminal. Another method is to iteratively improve the coarse position estimate using a numerical root-finding method, such as the Newton-Raphson method.

In another embodiment, two satellites are used to determine the position of the user terminal. In this embodiment, the method includes the steps of estimating the radius of the earth at a user terminal initial position estimate to produce a coarse radius estimate; determining the distances between the user terminal and the satellites; and determining a coarse position estimate based on the coarse radius estimate and the distances.

In this embodiment, the coarse position estimate can be improved using either of two methods. One method includes the steps of updating the coarse radius estimate using the coarse position estimate to produce a fine radius estimate, and then updating the coarse position estimate based on the fine radius estimate and the distances to produce a fine position estimate for the user terminal. Another method is to iteratively improve the coarse position estimate using a numerical root-finding method, such as the Newton-Raphson method.

The primary advantage of the present invention is that it permits the position of a user terminal to be determined accurately and rapidly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

I. Introduction

The present invention comprises an apparatus and method for rapidly determining the position of a user terminal within the service area of a satellite communications system based on the distances (ranges) between the user terminal and one or more satellites, the rate of change of those distances (range rates), and the positions and velocities of the satellites.

The present invention is particularly suited for use in communications systems employing low Earth orbit (LEO) satellites. However, as would be apparent to one skilled in the relevant art, the concept of the present invention can also be applied to satellite systems in which the satellites travel in non-LEO orbits. Before discussing the embodiments of the present invention, a typical environment in which the invention can operate is presented.

II. A Typical Satellite Communications System

Figure 1:
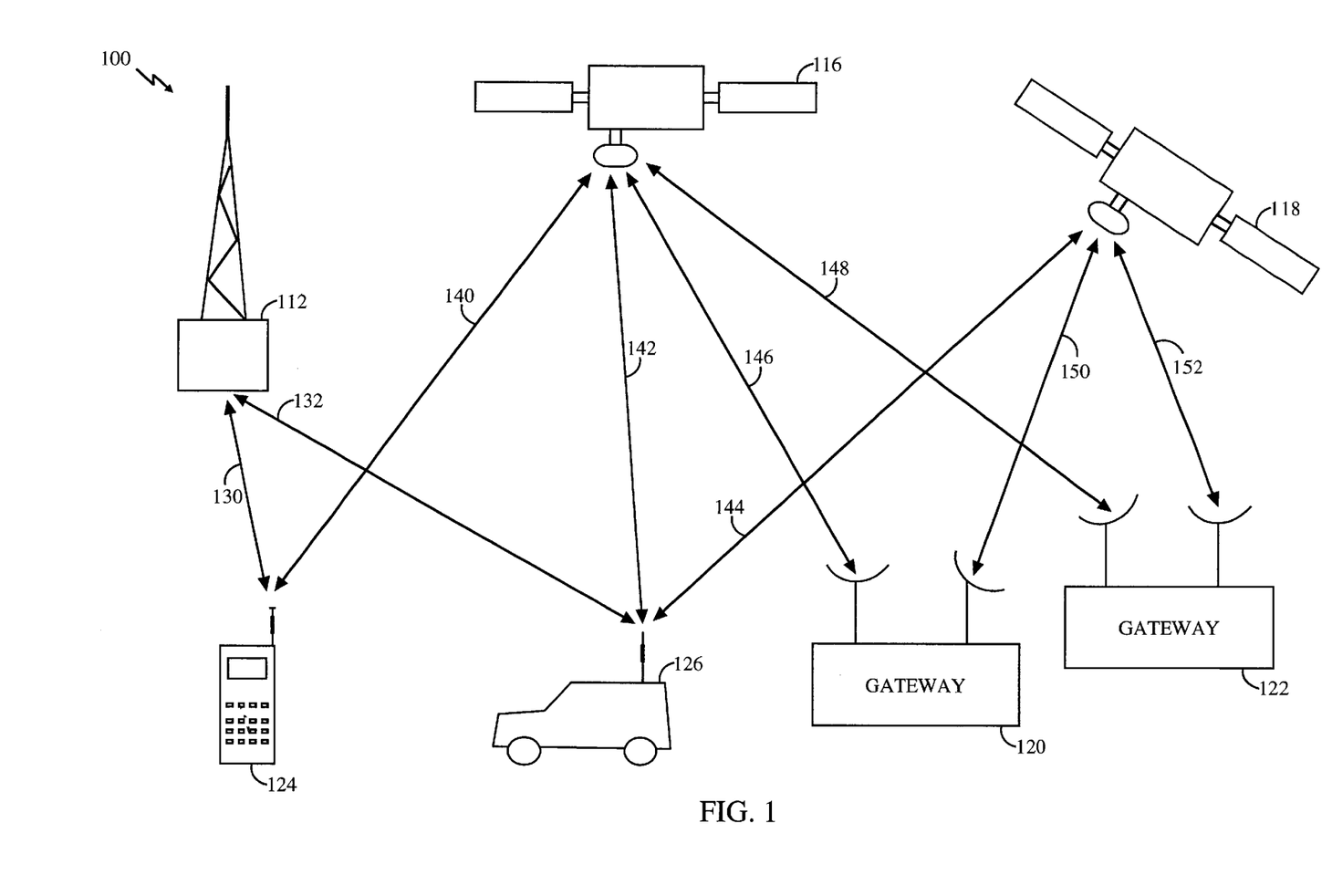
FIG. 1 illustrates an exemplary wireless communication system in which the present invention is useful.

An exemplary wireless communication system in which the present invention is useful is illustrated in FIG. 1. It is contemplated that this communication system uses code division multiple access (CDMA) type communication signals, but this is not required by the present invention. In a portion of a communication system 100 illustrated in FIG. 1, one base station 112, two satellites 116 and 118, and two associated gateways or hubs 120 and 122 are shown for effecting communications with two remote user terminals 124 and 126. Typically, the base stations and satellites/gateways are components of separate communication systems, referred to as being terrestrial- and satellite-based, although this is not necessary. The total number of base stations, gateways, and satellites in such systems depends on desired system capacity and other factors well understood in the art.

The terms "base station" and "gateway" are sometimes used interchangeably in the art, each being a fixed central communication station, with gateways being perceived as specialized base stations that direct communications through satellites, or moving repeaters, while base stations use terrestrial antennas to direct communications within surrounding geographical regions. Central control centers typically have different functions to perform when interacting with gateways and satellites. However, the present invention finds application in systems using either gateways or base stations as central fixed communication stations. User terminals are also sometimes referred to as subscriber units, mobile units, mobile stations, or simply "users," "mobiles," or "subscribers" in some communication systems, depending on preference.

User terminals 124 and 126 each include a wireless communication device such as, but not limited to, a cellular telephone, a data transceiver, or a paging or position determination receiver, and can be hand-held or vehicle-mounted as desired. However, it is also understood that the teachings of the invention may be applicable to fixed units where remote wireless service is desired, and position is uncertain for some reason.

Generally, beams from satellites 116 and 118 cover different geographical areas in predefined patterns. Beams at different frequencies, also referred to as "sub-beams," or CDMA channels when CDMA type signals are used, can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

A variety of multi-satellite communication systems have been proposed with an exemplary system employing on the order of 48 or more satellites, traveling in eight different orbital planes in LEO orbits for servicing a large number of user terminals. However, those skilled in the art will readily understand how the teachings of the present invention are applicable to a variety of satellite system and gateway configurations, including other orbital distances and constellations.

In FIG. 1, some possible signal paths are illustrated for communications being established between user terminals 124 and 126 and base station 112, or through satellites 116 and 118, with gateways 120 and 122. The base station-user terminal communication links are illustrated by lines 130 and 132. The satellite-user terminal communication links between satellites 116 and 118, and user terminals 124 and 126 are illustrated by lines 140, 142, and 144. The gateway-satellite communication links, between gateways 120 and 122 and satellites 116 and 118, are illustrated by lines 146, 148, 150, and 152. Gateways 120 and 122, and base station 112, may be used as part of one or two-way communication systems or simply to transfer messages or data to user terminals 124 and 126.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination. A preferred application is in CDMA wireless spread spectrum communication systems for wireless telephone service.

III. Position Equations

This section describes the generation of a set of non-linear equations for use in determining the location of the user terminal. The quantities used in these equations are the ranges and range rates between the user terminal and one or more satellites, and the positions and velocities of the satellites. Of course, other quantities can be used to generate a set of non-linear equations without departing from the scope of the present invention.

Figure 2:
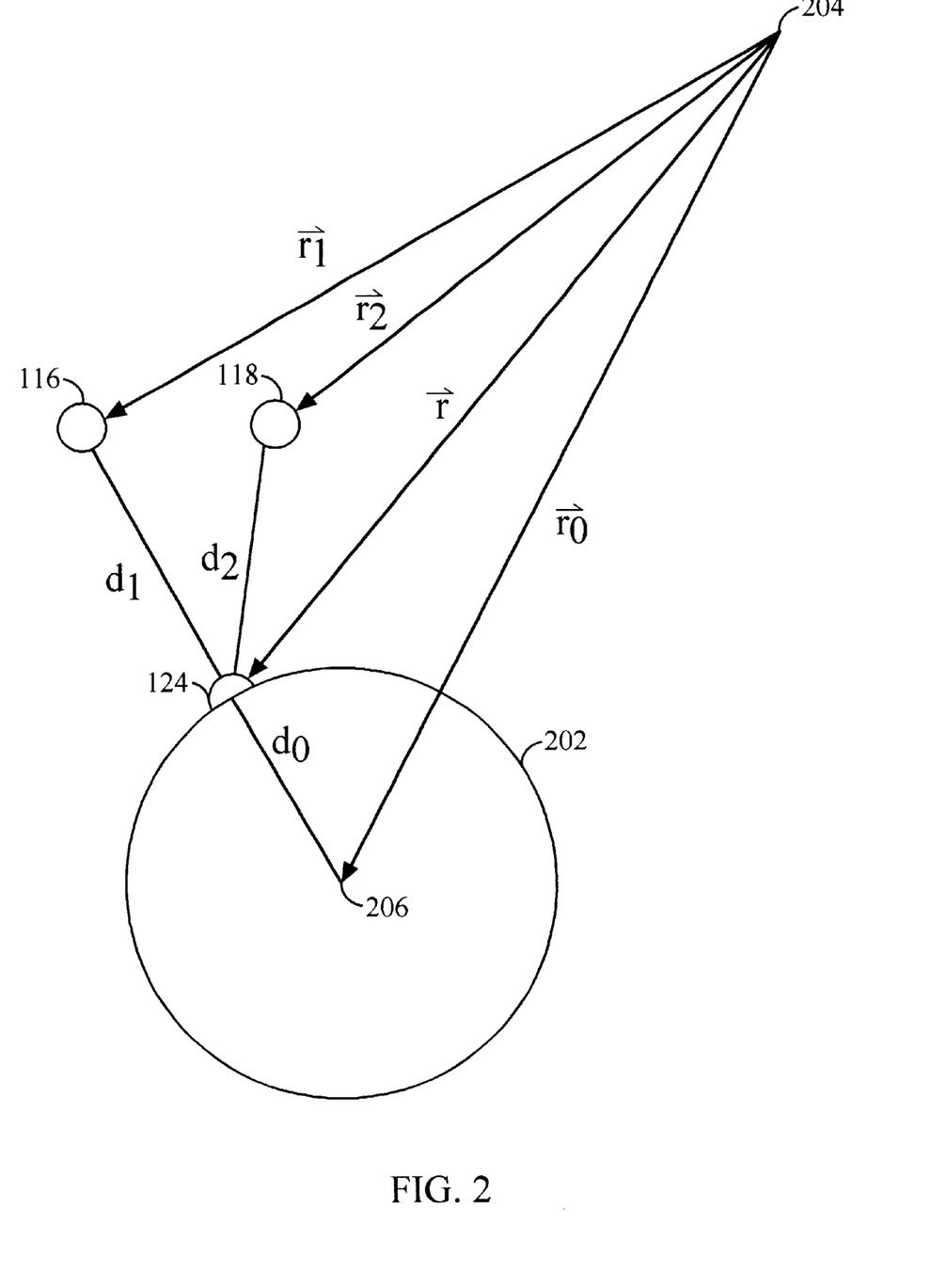
FIG. 2 depicts the geometry of two satellites, a user terminal, and the Earth with respect to an arbitrary reference point.

FIG. 2 depicts the geometry of two satellites 116, 118, a user terminal 124, and the Earth 202 with respect to an arbitrary reference point 204. The center of the Earth is represented by point 206. Two cases are discussed. In the first case, two satellites are used in determining the position of the user terminal. In the second case, only one satellite is used.

When two satellites are available, the user terminal position can be described by the following non-linear equations.

$$d_0^2 = (\vec{r} - \vec{r}_0)^2 \quad (1)$$

$$d_1^2 = (\vec{r} - \vec{r}_1)^2 \quad (2)$$

$$d_2^2 = (\vec{r} - \vec{r}_2)^2 \quad (3)$$

where the 3-dimensional vector $\vec{r}$ is the user terminal position to be solved within a preselected frame of reference, vector $\vec{r}_0$ describes the center of the Earth, $d_0$ is the radius of the Earth, $\vec{r}_1$, $\vec{r}_2$ are the positions of the two satellites, and $d_1$, $d_2$ are the distances between the user terminal and the two satellites, respectively, all in the selected frame of reference, as depicted in FIG. 2.

When only one satellite is available, the user terminal position can be described by the following non-linear equations.

$$d_0^2 = (\vec{r} - \vec{r}_0)^2 \quad (4)$$

$$d_1^2 = (\vec{r} - \vec{r}_1)^2 \quad (5)$$

$$d_1 v_r = (\vec{r} - \vec{r}_1) \cdot \vec{v} \quad (6)$$

where v is the velocity of the satellite in the ECEF (Earth Centered Earth Fixed) frame of reference and the radial velocity $\vec{v}_r$ is measured from the known Doppler effect created by the relative motion of the satellite and the user terminal.

Returning to the two-satellite case and subtracting equation (1) from equation (2), and subtracting equation (1) from equation (3), yields two linear equations useful for solving for $\vec{r}$:

$$\vec{r} \cdot (\vec{r}_1 - \vec{r}_0) = \tfrac{1}{2}[(r_1^2 - r_0^2) - (d_1^2 - d_0^2)] \quad (7)$$

$$\vec{r} \cdot (\vec{r}_2 - \vec{r}_0) = \tfrac{1}{2}[(r_2^2 - r_0^2) - (d_2^2 - d_0^2)] \quad (8)$$

Similarly, for the one satellite case, subtracting equation (4) from equation (5) and combining the result with equation (6) yields two linear equations for, or involving, $\vec{r}$:

$$\vec{r} \cdot (\vec{r}_1 - \vec{r}_0) = \tfrac{1}{2}[(r_1^2 - r_0^2) - (d_1^2 - d_0^2)] \quad (9)$$

$$\vec{r} \cdot \vec{v} = d_1 v_r + \vec{r}_1 \cdot \vec{v} \quad (10)$$

The relationships shown for both scenarios reduce to the same type of or form as the linear equations:

$$\vec{r} \cdot \vec{A} = a \quad (11)$$

$$\vec{r} \cdot \vec{B} = b \quad (12)$$

where $\vec{A}$, $\vec{B}$, and a,b are known vectors and numbers, respectively. To solve equations (11) and (12), $\vec{r}$ is separated into two parts:

$$\vec{r} = \vec{r}_h + \vec{r}_v \quad (13)$$

where $\vec{r}_h$ lays in the plane spanned by $\vec{A}$ and $\vec{B}$, and $\vec{r}_v$ is perpendicular to that plane. Because $\vec{r}_h$ is in the plane spanned by $\vec{A}$ and $\vec{B}$, it can be written as:

$$\vec{r}_h = xA + yB \quad (14)$$

Substituting equations (13) and (14) into equations (11) and (12), and recognizing that $\vec{r}_v$ has no contribution, yields:

$$xA^2 + yA \cdot B = a \quad (15)$$

$$x\vec{A} \cdot \vec{B} + yB^2 = b \quad (16)$$

Hence, x, y and $\vec{r}_h$ can be solved, yielding:

$$\vec{r}_h = \frac{1}{A^2 B^2 - ((\vec{A} \cdot \vec{B}))^2}\left[(aB^2 - b\vec{A} \cdot \vec{B})\vec{A} + (bA^2 - a\vec{A} \cdot \vec{B})\vec{B}\right] \quad (17)$$

From equation (17) it is clear that when vectors $\vec{A}$ and $\vec{B}$ are parallel to each other, the denominator of equation (17) vanishes and the equation can not be solved. However, this can only happen in the two satellite case when both satellites and the center of the Earth fall on the same line, or in the one satellite case when the velocity vector of the satellite points directly towards or away from the center of the Earth. In a preferred embodiment of the present invention, and in typical satellite communication systems, neither scenario is possible.

Returning to the two satellite problem, we have:

$$\vec{A} = \vec{r}_1 - \vec{r}_0, \text{ and } a = \tfrac{1}{2}[(r_1^2 - r_0^2) - (d_1^2 - d_0^2)] \quad (18)$$

$$\vec{B} = \vec{r}_2 - \vec{r}_0, \text{ and } b = \tfrac{1}{2}[(r_2^2 - r_0^2) - (d_2^2 - d_0^2)] \quad (19)$$

and for the one satellite problem, we have:

$$\vec{A} = \vec{r}_1 - \vec{r}_0, \text{ and } a = \tfrac{1}{2}[(r_1^2 - r_0^2) - (d_1^2 - d_0^2)] \quad (20)$$

$$\vec{B} = \vec{v}, \text{ and } b = d_1 v_r + \vec{r}_1 \cdot \vec{v} \quad (21)$$

The direction of $\vec{r}_v$ is known; it can be calculated, for example, by taking the normalized cross product of $\vec{A}$ and $\vec{B}$. The magnitude of $\vec{r}_v$ can be found, for example, by combining equations (2) and (5) to yield:

$$d_1^2 = (\vec{r} - \vec{r}_1)^2 = (\vec{r}_v + \vec{r}_h - \vec{r}_1)^2 = r_v^2 + (\vec{r}_h - \vec{r}_1)^2 \quad (22)$$

and, therefore:

$$|\vec{r}_v| = \sqrt{d_1^2 - (\vec{r}_h - \vec{r}_1)^2} \quad (23)$$

We have made use of the fact that $\vec{r}_v$ is perpendicular to $\vec{r}_h - \vec{r}_1$ in order to arrive at the above result. The result is a mirror pair of solutions:

$$\vec{r} = \vec{r}_h \pm \vec{r}_v \quad (24)$$

A technique for selecting the correct solution from the pair of solutions is disclosed in a commonly-owned, copending U.S. patent application Ser. No. 08/723,723, filed Sep. 30, 1996, entitled "Ambiguity Resolution for Ambiguous Position Solutions Using Satellite Beams," which is incorporated by reference herein in its entirety. In this technique, each beam has a unique beam identification scheme or identifier associated with it. Resolving ambiguity is accomplished by having a user terminal provide the identifier for the beam (sub-beam) it is communicating on, either forward or reverse link (which may be identified independently or separately in some systems), to the gateway. Using known or projected locations for beams, at least relative to a known satellite track that passes by the user terminal, a determination can then be made as to which solution fits with the identified beam. However, other known techniques can also be used to help resolve such an ambiguity in position determination.

IV. Position Determination

Figure 3:
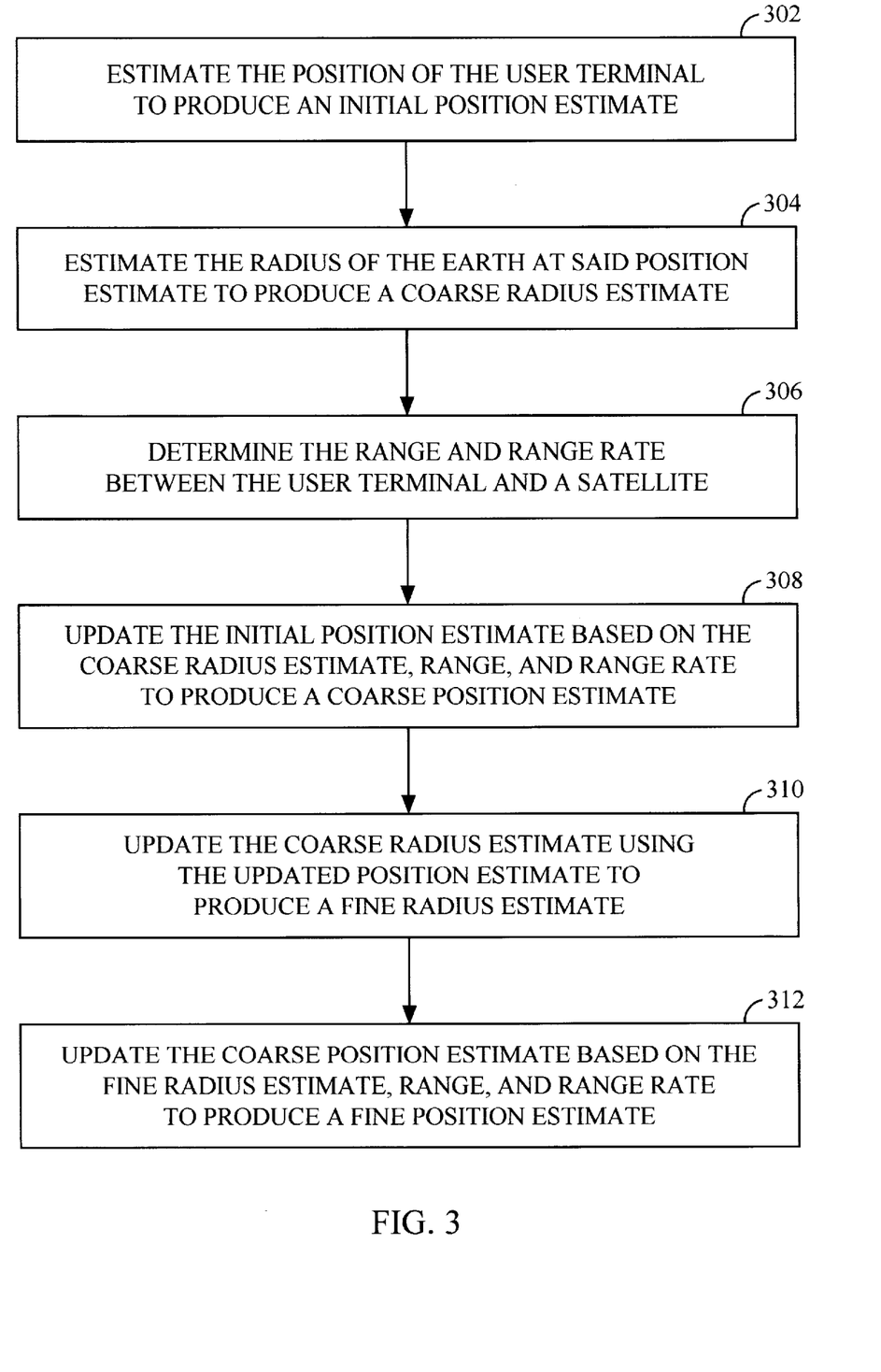
FIG. 3 is a flowchart depicting a method for determining the position of a user terminal when only one satellite is available, according to a preferred embodiment of the present invention.

FIG. 3 is a flowchart depicting a method for determining the position of a user terminal when only one satellite is available according to a preferred embodiment of the present invention. In step 302, an initial estimate of the Earth's radius is made or selected for the location of the user terminal. This is referred to as a coarse Earth radius estimate. In a preferred embodiment, the location of the gateway that is communicating with the user terminal is selected as the initial position for the Earth radius estimate, due to a well known location on the surface of the Earth. This radius can be pre-stored in a memory element or database for use during the position determination process. However, other pre-selected locations can be used, such as fixed reference points, geographical references, prior known or estimated locations, and the like. The coarse Earth radius estimate made or selected in step 302 is used as the coarse radius estimate for the user terminal location. In one embodiment, the radius is computed using a well-known smooth Earth model, such as a sphere or ellipsoid.

In step 306, the distance (range) between the user terminal and the satellite and the rate of change of that distance (range rate) is determined. A technique for accurately determining range and range rate is disclosed in a commonly-owned patent application, filed concurrently herewith, entitled "Accurate Range and Range Rate Determination in a Satellite Communications System," Ser. No. 09/150,500(to be assigned, Attorney Docket Number QCPD889), which is incorporated by reference herein in its entirety. For convenience, that technique is now summarized.

According to the technique, the user terminal receives a first signal transmitted from a satellite. The user terminal measures the Doppler frequency shift this signal experienced when traveling between the satellite and the user terminal, and it timestamps the measurement. That is, the user terminal associates a time for when the measurement was made, relative to system time, with the measurement value. The user terminal then transmits the Doppler shift measurement and the timestamp to the gateway as a second signal. The gateway measures the round trip delay between the transmission of the first signal by the satellite and the reception of the second signal at the gateway. The gateway also measures the Doppler frequency shift of the second signal and timestamps the resulting measurements or values. The gateway then determines the range and range rate between the satellite and the user terminal based on the round trip delay, the Doppler frequency shifts, and the timestamps.

If a second satellite is available, the present invention can obtain the range and range rate between the user terminal and the second satellite by taking two additional measurements. According to this method, the user terminal receives a third signal transmitted from the second satellite. The user terminal measures the Doppler frequency shift the third signal experienced between the second satellite and the user terminal. The user terminal also measures the arrival time difference between the first and third signals and timestamps the resulting measurement. The user terminal then transmits these measurements to the gateway. The gateway then determines the range and range rate between the second satellite and the user terminal based on the round trip delay, the Doppler shift of the third signal, and the arrival time difference.

In a preferred embodiment, this technique is used in step 306 to determine the range and range rate between the user terminal and the satellite. However, other techniques can be used to determine these parameters.

In step 308, the range, range rate, and coarse radius estimate are used to produce a coarse position estimate for the user terminal. In a preferred embodiment, this step is performed according to the method described above with respect to equations (4) through (6) and (9) through (24). This coarse position estimate is of sufficient accuracy for many applications. However, the present invention also provides two embodiments for improving this coarse position estimate to obtain a more accurate estimate of the user terminal position. This increased accuracy is very useful in a communication system, such as for more accurate hand-off control, power control, or emergency positioning.

According to a first embodiment, the coarse position estimate is used to refine the coarse radius estimate, as shown in step 310. In one embodiment, the radius is computed at the coarse position estimate using a detailed Earth terrain model. Then in step 312, the coarse radius estimate is used to produce a fine radius position estimate for the user terminal. In a preferred embodiment, this step is performed according to the method described above with respect to equations (4) through (6) and (9) through (24). Steps 310 and 312 can be repeated in succession to produce even more accurate results, as would be apparent to one skilled in the relevant arts.

In a second embodiment, the coarse position estimate is iteratively improved using a numerical root-finding method, such as the Newton-Raphson method, which is well-known in the relevant arts. When such a method is used with a good starting point, such as the coarse position estimate of the present invention, the solution converges rapidly on a fine position estimate.

Figure 4:
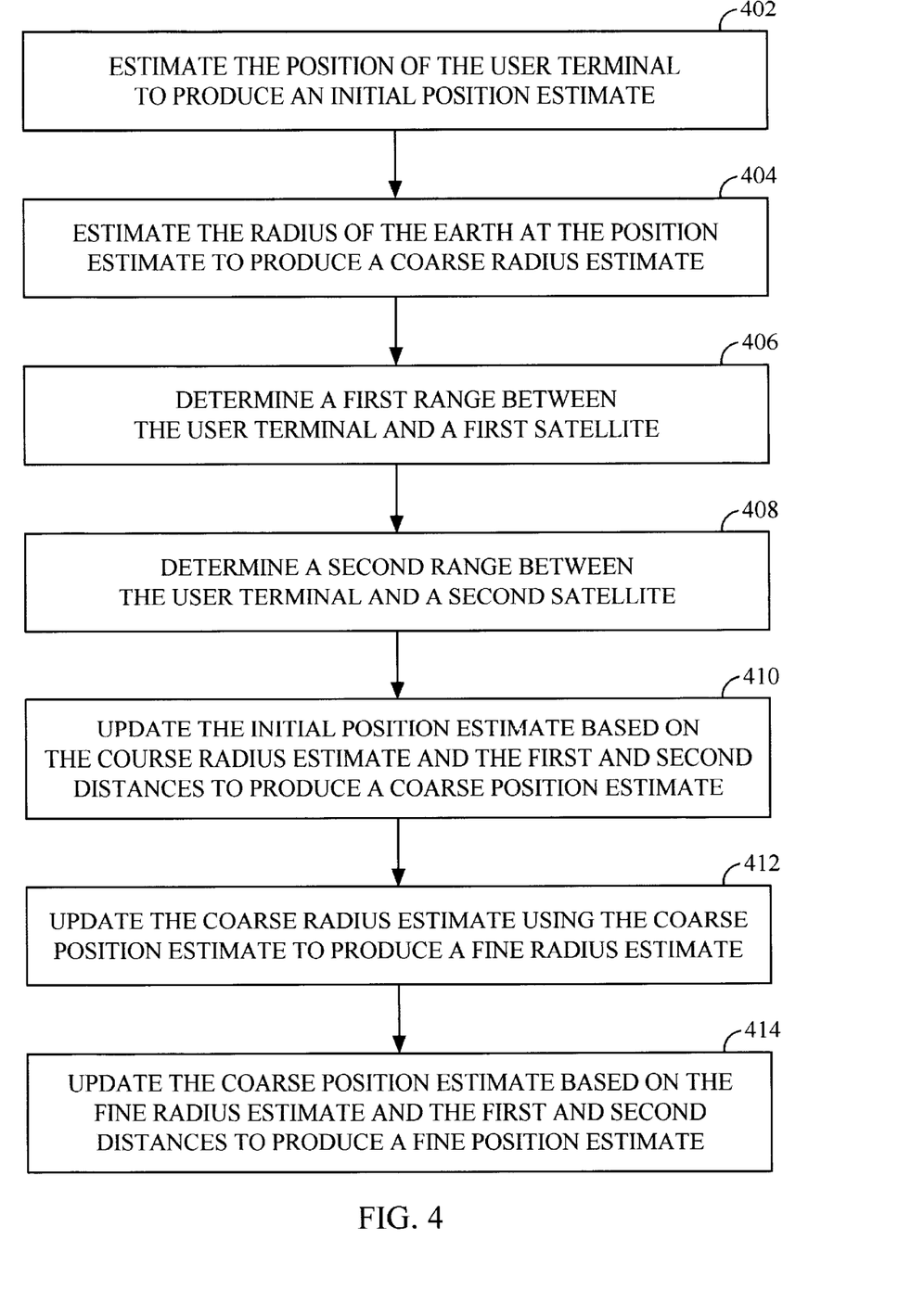
FIG. 4 is a flowchart depicting a method for determining the position of a user terminal when two satellites are available, according to a preferred embodiment of the present invention.

FIG. 4 is a flowchart depicting a method for determining the position of a user terminal when two satellites are available according to a preferred embodiment of the present invention. In step 402, an initial estimate is made or selected of the radius of the Earth for the location of the user terminal, as the coarse radius estimate. In a preferred embodiment, as before, the location of the gateway that is communicating with the user terminal is selected as the initial position for the Earth radius estimate. However, other pre-selected locations can be used, such as fixed reference points, geographical references, prior known or estimated locations, and the like. In one embodiment, the radius is computed using a well-known smooth Earth model, such as a sphere or ellipsoid.

In steps 406 and 408 the range between the user terminal and each satellite is determined, as described above. In step 410, the ranges and coarse radius estimate are used to produce a coarse position estimate for the user terminal. In a preferred embodiment, this step is performed according to the method described above with respect to equations (1) through (3), (7) through (8) and (11) through (24). This coarse position estimate is of sufficient accuracy for many applications. However, the present invention also provides two embodiments for improving this coarse position estimate to obtain a more accurate estimate of the user terminal position.

According to a first embodiment, the coarse position estimate is used to refine the coarse radius estimate, as shown in step 412. In one embodiment, the radius is computed at the coarse position estimate using a detailed Earth terrain model. Then in step 414, the fine radius estimate is used to produce a fine position estimate for the user terminal. In a preferred embodiment, this step is performed according to the method described above with respect to equations (1) through (3), (7) through (8) and (11) through (24). Steps 412 and 414 can be repeated in succession to produce even more accurate results, as would be apparent to one skilled in the relevant arts.

In a second embodiment, the coarse position estimate is iteratively improved using a numerical root-finding method, such as the Newton-Raphson method.

V. Example Environment

In a preferred embodiment, the present invention is implemented using apparatus in gateways 120 and 122, along with measurements made in user terminals. However, the computations used by the present invention can be implemented in other locations, as would be apparent to one skilled in the relevant arts.

Figure 5:
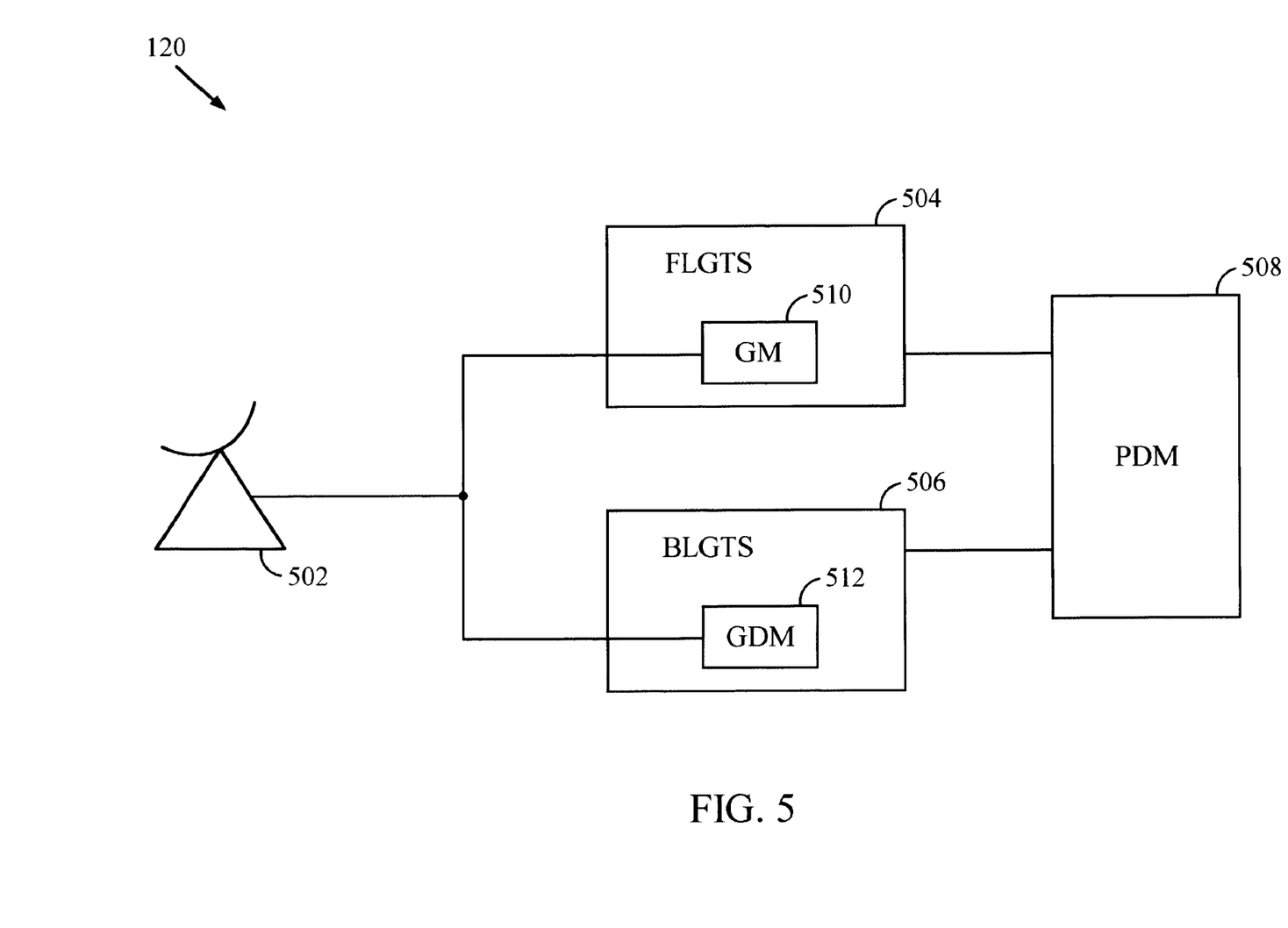
FIG. 5 depicts exemplary base station apparatus useful in implementing the present invention.

FIG. 5 is a block diagram illustrating the general functional architecture of a gateway 120 operating according to a preferred embodiment of the present invention. Gateway 120 includes a gateway antenna 502, a forward link gateway transceiver system (FLGTS) 504, a reverse link gateway transceiver system (RLGTS) 506, and a position determination module (PDM) 508. FLGTS 504 includes one or more gateway modulators (GM) 510. RLGTS 506 includes gateway one or more demodulators (GDM 512).

FLGTS 504 manages the forward link, and generally pre-corrects the timing of forward link signals, including paging and traffic signals, such that the signals are aligned with system timing or phase when they arrive at the forward link satellite. This timing correction accounts for delay between GM 510 and the gateway antenna and propagation delay, including atmospheric effects, between the gateway antenna and a forward link satellite. FLGTS 504 also generally pre-corrects the frequency of these signals to compensate for the Doppler shift between the gateway and a forward link satellite. GM 510 modulates the forward link signal for transmission by the gateway antenna. Techniques for time and frequency precorrection are disclosed in a commonly-owned, copending U.S. patent application Ser. No. 08/723,490, filed Sep. 30, 1996, entitled "Time and Frequency Precorrection for Non-Geostationary Satellite Systems," and in U.S. patent application Ser. Nos. 08/723, 725, 08/723,851, and 08/723,722, entitled "Unambiguous Position Determination Using Two Low-Earth Orbit Satellites," "Position Determination Using One Low-Earth Orbit Satellite," and "Passive Position Determination Using Two Low-Earth Orbit Satellites," respectively, which are incorporated herein by reference in their entirety. There are other frequency pre-correction techniques well known in the art.

RLGTS 506 manages the reverse link. RLGTS 506 adjusts the gateway time measurements, such as one-way or round trip delay, in order to compensate for the delay the reverse link signal incurs between gateway antenna 502 and GDM 512. RLGTS 506 also compensates gateway frequency measurements for the Doppler shift the reverse downlink signal experiences between the reverse link satellite and the gateway antenna. GDM 512 demodulates the reverse link signal received by the gateway antenna.

PDM 508 performs the calculations necessary to determine the position of the user terminal based on both the ranges and range-rates determined between the user terminal and one or satellites, and position and velocity information for the forward and reverse link satellites. The range and range-rates are determined from or based on measurements taken by the user terminal and the gateway, using known techniques. For example, offsets in PN code phase measured for signals received at the user terminal are used to determine time of arrival delay, and time-stamping can be used in determining round trip delay at the gateway. PDM 508 computes the propagation delays for the forward downlink and the reverse uplink and performs several timing corrections for the forward and reverse links, as desired. PDM 508 can also compute Doppler shifts for the forward downlink and the reverse uplink.

In order to determine the actual "in air" delay time, PDM 508 subtracts the delay experienced by the signal during processing at the user terminal, when a value for this delay is reported by the user terminal to the gateway. Because the forward link signal arrival time at the forward link satellite is aligned with system time, PDM 508 also subtracts the delay experienced at the forward link satellite between reception of the forward link signal from the gateway and transmission of the forward link signal to the user terminal.

RLGTS 506 generally postcorrects the frequency of the reverse link signal to eliminate the Doppler shift that the signal experiences between the reverse link satellite and the gateway. This frequency may also be corrected by PDM 508 for user terminal clock error. A time stamp value is stored with the delay and frequency measurements to indicate the time at which the measurements are taken. Because the reverse downlink signal is not measured until it reaches GDM 512, RLGTS 506 subtracts the delay the signal experiences between gateway antenna 502 and GDM 512 from the measured delay. PDM 508 then uses the radius of the Earth at the position of the gateway, or antenna 502 to compute the user terminal position.

Figure 6:
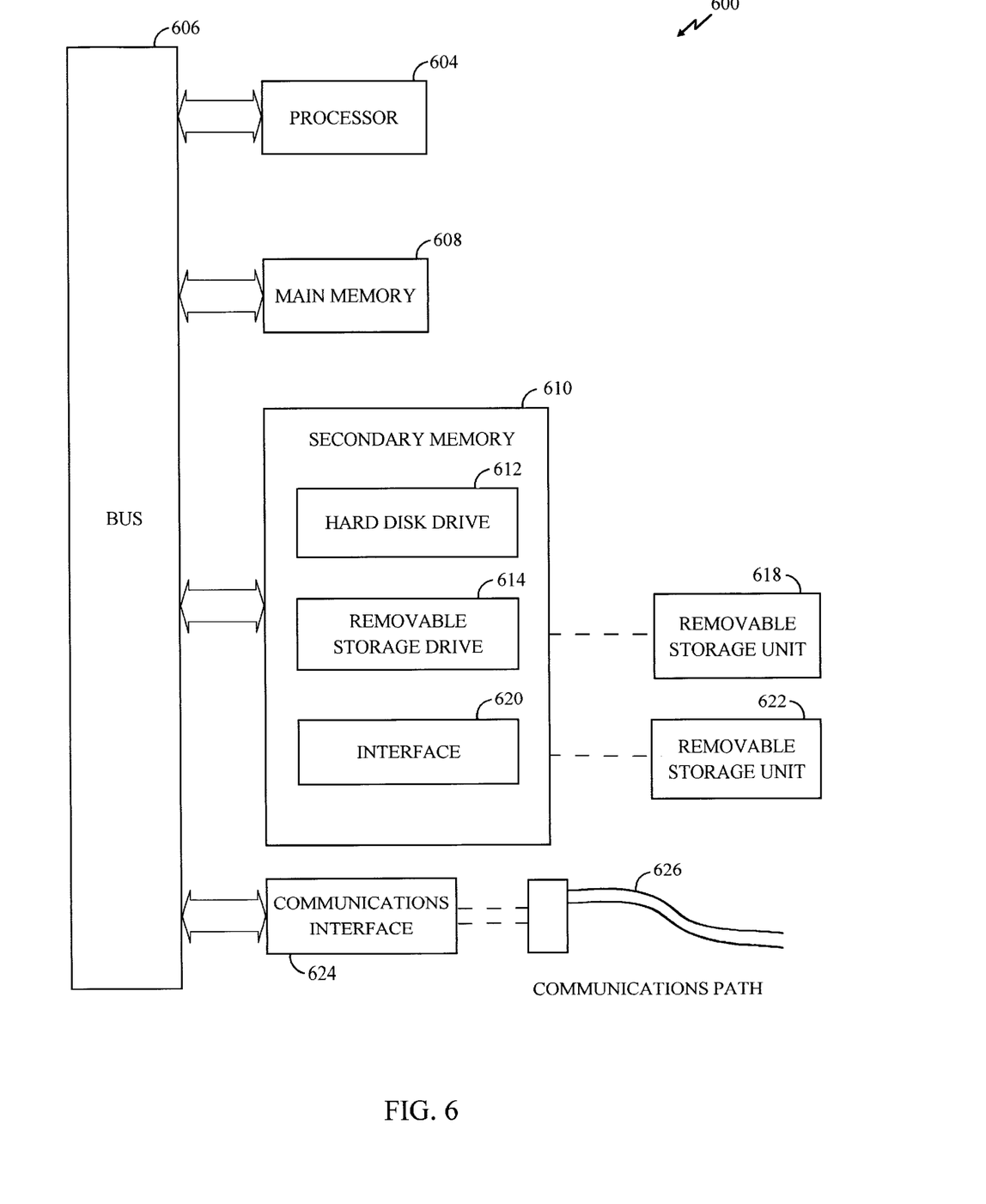
FIG. 6 depicts an exemplary control system capable of carrying out the functionality of the present invention.

The present invention may be implemented in PDM 508 using hardware, software, or a combination thereof, and may be implemented in a computer system or other processing system. In one embodiment, the invention is directed toward processing elements such as a computer system capable of carrying out the functionality described herein, which could be located at the gateway or form part of PDM 508. An exemplary signal processing, control, or computer system 602 is shown in FIG. 6. Computer system 602 includes one or more processors, such as processor 604, connected to a communication bus 606. Various software embodiments or control processes are described in terms of this example computer system. After reading this description, it will become apparent to a person skilled in the relevant art how to implement the invention using other computer systems and/or computer architectures.

Processing or computer system 602 also includes a main memory 608, preferably random access memory (RAM), and can also include a secondary memory 610. The secondary memory 610 can include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well known manner. Removable storage unit 618, represents a known type of floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 602. Such means can include, for example, a removable storage unit 622 and an interface 620. Examples of such can include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 618 to computer system 602.

Computer system 602 can also include a communications interface 624. Communications interface 624 allows software and data to be transferred between computer system 602 and external devices. Examples of communications interface 624 can include a modem, a network interface (such as an Ethernet card), a communications port, a PCM-CIA slot and card, etc. Software and data transferred via communications interface 624 are in the form of signals which can be electronic, electromagnetic, optical or other signals capable of being transferred by communications interface 624. These signals 626 are provided to communications interface via a channel 628. This channel 628 carries signals 626 and can be implemented using wire or cable, fiber optics, a phone line, a cellular phone link, an RF link and other known communications channels.

In this document, the terms "computer program medium" and "computer usable medium" are used to generally refer to media such as removable storage device 618, a hard disk installed in hard disk drive 612, and signals 626. These computer program products are means for providing software to computer system 602.

Computer or control programs (also called computer control logic) are stored in main memory and/or secondary memory 610. Computer programs can also be received via communications interface 624. Such computer programs, when executed, enable the computer system 602 to perform the features of the present invention as discussed herein. In particular, the computer programs, when executed, enable the processor 604 to perform the features of the present invention. Accordingly, such computer programs represent controllers of the computer system 602.

In an embodiment where the invention is implemented using software, the software may be stored in a computer program product and loaded into computer system 602 using removable storage drive 614, hard drive 612 or communications interface 624. The control logic (software), when executed by processor 604, causes processor 604 to perform the functions of the invention as described herein.

In another embodiment, the invention is implemented primarily in dedicated specialized hardware configured for this function using, for example, components such as application specific integrated circuits (ASICs) or one or more circuit card assemblies. Implementation of the hardware state machine so as to perform the functions described herein will be apparent to persons skilled in the relevant art(s). Alternatively, processing elements may be implemented as standard elements or generalized hardware including a variety of digital signal processors or programmable electronic devices or computers that operate under the control of special function software or firmware programming. In yet another embodiment, the invention is implemented using a combination of both hardware and software.

Figure 7:
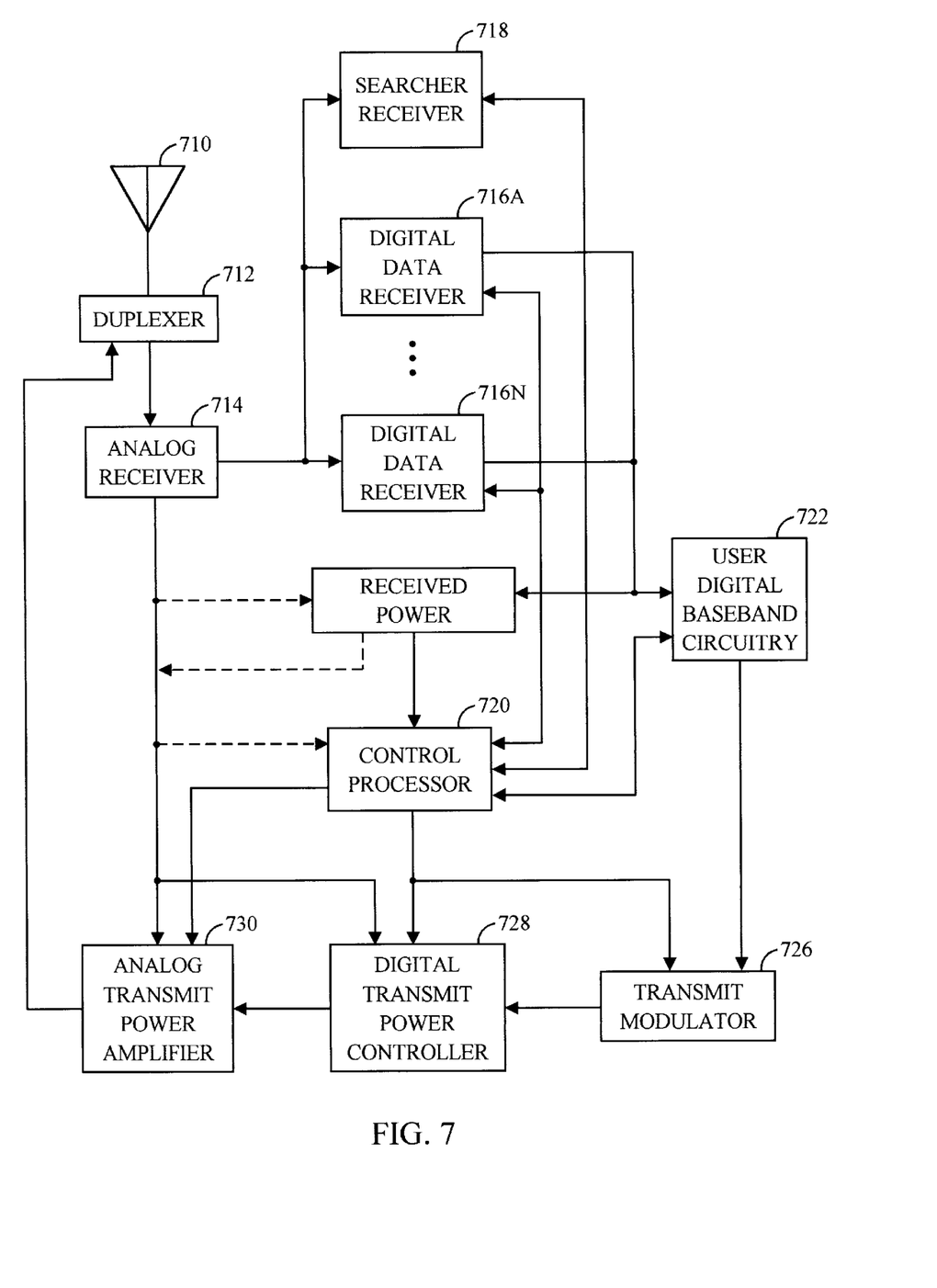
FIG. 7 depicts exemplary user terminal apparatus useful in implementing the present invention.

An exemplary transceiver 700 for use in a user terminal 124 to acquire signals, perform the desired measurements, and provide information used to implement the invention is illustrated in FIG. 7. Such transceivers are known in the art, and are discussed in the patents referenced above, and others such as U.S. Pat. No. 5,109,390. As seen in FIG. 7, communication signals are received through at least one antenna 710 and transferred to an analog receiver 714, where they are downconverted, amplified, and digitized. The resulting digital communication signals are transferred to at least one digital data receiver 716A and preferably at least one digital searcher receiver 718. Additional digital data receivers 716B–716N can be used to obtain desired levels of signal diversity or receive multiple signals, as would be apparent to one skilled in the relevant art. Additional searcher receivers can also be used for implementing more complex signal acquisition or searching techniques.

The data and searcher receivers are configured with signal correlation elements to demodulate or acquire specific signals. Searcher receivers are used to search for pilot signals, or other relatively fixed pattern strong signals, while data receivers are used to demodulate other signals associated with detected pilot signals. Therefore, the outputs of these units can be monitored to determine the energy in or frequency of the pilot signal or other signals. These receivers also employ frequency tracking elements that can be monitored to provide current frequency and timing information for signals being demodulated.

At least one user terminal control processor 720 is coupled to data receivers 716A–716N and searcher receiver 718. Control processor 720 provides, among other functions, basic signal processing, timing, power and handoff control or coordination, and selection of frequency used for signal carriers, as well as the selection or manipulation of PN code sequences or orthogonal functions used for processing communication signals. Control processor 720 can also determine relative signal strength and various related signal parameters based on the receiver outputs. Computations of signal parameters, such as timing and frequency may include the use of additional or separate dedicated circuitry to provide increased efficiency or speed in measurements or improved allocation of control processing resources.

Remaining baseband circuitry 722 receives the outputs of data receivers 716A–716N, and uses well known processing and presentation elements to transfer information to and from a user terminal user. If diversity signal processing is employed, user digital baseband circuitry 722 can comprise a diversity combiner and decoder. Some of these elements may also operate under the control of, or in communication with, control processor 720.

Voice or other data to be transmitted by the user terminal as a communications signal, is also processed by portions of digital baseband circuitry 722. For this operation, data is received, stored, processed, and otherwise prepared for transmission, and then provided to a transmit modulator 726, operating under the control of processor 720. The output of transmit modulator 726 is transferred to a power controller 728 which provides output power control to a transmit power amplifier 730 for final transmission of the output signal from antenna 710 to a gateway or base station.

The user terminal measures the time difference between the clock phase of the forward downlink signal being received and the clock phase of a user terminal reference clock. In a preferred embodiment, this delay is obtained by determining the timing offset in the phase of a received PN code versus a locally generated offset PN code. The user terminal also measures the frequency or the Doppler shift that the forward link signal experiences between the satellite and the user terminal. The gateway generally precorrects the frequency of the forward link signal, as discussed above, to eliminate or counter the expected Doppler shift the link signal experiences between the gateway and the forward link satellite, and possibly to correct for user terminal clock error.

In some cases the gateway may also pre-correct the signal timing to account for clock error and code Doppler. The user terminal can employ similar techniques to pre-correct at least some of the effects of Doppler on the return link signals.

Information or data corresponding to one or more measured signal parameters for received communication signals, or one or more shared resource signals, can be sent to a gateway using a variety of techniques known in the art. The user terminal uses one of these techniques to report the measured time or code phase delay and frequency for received signals. For example, this information can be transferred as a separate information signal or be appended to other messages prepared by user digital baseband circuitry 722. Alternatively, the information can be inserted as predetermined control bits by transmit modulator 726 or transmit power controller 728 under control of control processor 720, using known "puncturing" or multiplexing techniques. Where desired, the measurements are reported to the gateway with timestamps to indicate the time at which the measurements were taken by the user terminal.

VI. Conclusion

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What I claim as the invention is:

1. A method for determining the position of a user terminal in a satellite communications system, comprising the steps of:
   (a) estimating the radius of the Earth at an initial user terminal position estimate to produce a coarse radius estimate;
   (b) determining a distance between the user terminal and a satellite;
   (c) determining a rate of change of said distance;
   (d) determining a coarse position estimate based on said coarse radius estimate, said distance, and said rate of change of said distance;
   (e) updating said coarse radius estimate using said coarse position estimate to produce a fine radius estimate; and
   (f) updating said coarse position estimate based on said fine radius estimate, said distance, and said rate of change of said distance to produce a fine position estimate for the user terminal.

2. The method of claim 1, wherein step (e) comprises using a detailed Earth terrain model to estimate the radius of the Earth.

3. The method of claim 1, further comprising the step of iteratively improving said coarse position estimate using a numerical root-finding method.

4. The method of claim 3, wherein said numerical root-finding method is the Newton-Raphson method.

5. A method for determining the position of a user terminal in a satellite communications system, comprising the steps of:
   (a) estimating the radius of the Earth at a user terminal initial position estimate to produce a coarse radius estimate;
   (b) determining a first distance between the user terminal and a first satellite;
   (c) determining a second distance between the user terminal and a second satellite;
   (d) computing a coarse position estimate based on said coarse radius estimate, said first distance, and said second distance;
   (e) updating said coarse radius estimate using said coarse position estimate to produce a fine radius estimate; and
   (f) updating said coarse position estimate based on said fine radius estimate, said first distance, and said second distance to produce a fine position estimate for the user terminal.

6. The method of claim 5, wherein step (e) comprises using a detailed Earth terrain model to estimate the radius of the Earth.

7. The method of claim 5, further comprising the step of:
   iteratively improving said coarse position estimate using a numerical root-finding method.

8. The method of claim 7, wherein said numerical root-finding method is the Newton-Raphson method.

9. Apparatus for determining the position of a user terminal in a satellite communications system, comprising:
   means for estimating the radius of the Earth at a user terminal initial position estimate to produce a coarse radius estimate;
   means for determining a distance between the user terminal and a satellite;
   means for determining a rate of change of said distance;
   means for computing a coarse position estimate based on said coarse radius estimate, said distance, and said rate of change of said distance;
   means for updating said coarse radius estimate using said coarse position estimate to produce a fine radius estimate; and
   means for updating said coarse position estimate based on said fine radius estimate, said distance, and said rate of change of said distance to produce a fine position estimate for the user terminal.

10. The apparatus of claim 9, wherein said means for updating said coarse radius estimate comprises means for using a detailed Earth terrain model to estimate the radius of the Earth.

11. The apparatus of claim 9, further comprising means for iteratively improving said coarse position estimate using a numerical root-finding method.

12. The apparatus of claim 11, wherein said numerical root-finding method is the Newton-Raphson method.

13. Apparatus for determining the position of a user terminal in a satellite communications system, comprising:
   means for estimating the radius of the Earth at a user terminal initial position estimate to produce a coarse radius estimate;
   means for determining a first distance between the user terminal and a first satellite;
   means for determining a second distance between the user terminal and a second satellite;
   means for computing a coarse position estimate based on said coarse radius estimate, said first distance, and said second distance;
   means for updating said coarse radius estimate using said coarse position estimate to produce a fine radius estimate; and
   means for updating said coarse position estimate based on said fine radius estimate, said first distance, and said second distance to produce a fine position estimate for the user terminal.

14. The apparatus of claim 13, wherein said means for updating said coarse radius estimate comprises means for using a detailed Earth terrain model to estimate the radius of the Earth.

15. The apparatus of claim 13, further comprising means for iteratively improving said coarse position estimate using a numerical root-finding method.

16. The apparatus of claim 15, wherein said numerical root-finding method is the Newton-Raphson method.

17. A computer program product for use in a system for determining the position of a user terminal in a satellite communications system, said computer program product comprising a computer usable medium having computer readable program code means embodied in said medium for causing an application program to execute on a computer, said computer readable program code means comprising:

- a first computer readable program code means for causing said computer to estimate the radius of the Earth at a user terminal initial position estimate to produce a coarse radius estimate;
- a second computer readable program code means for causing said computer to determine a distance between the user terminal and a satellite;
- a third computer readable program code means for causing said computer to determine a rate of change of said distance;
- a fourth computer readable program code means for causing said computer to compute a coarse position estimate based on said coarse radius estimate, said distance, and said rate of change of said distance;
- a fifth computer readable program code means for causing said computer to update said coarse radius estimate using said coarse position estimate to produce a fine radius estimate; and
- a sixth computer readable program code means for causing said computer to update said coarse position estimate based on said fine radius estimate, said distance, and said rate of change of said distance to produce a fine position estimate for the user terminal.

18. The computer program product of claim 17, wherein said fifth computer readable program code means comprises a computer readable program code means for causing said computer to use a detailed Earth terrain model to estimate the radius of the Earth.

19. The computer program product of claim 17, further comprising a computer readable program code means for causing said computer to iteratively improve said coarse position estimate using a numerical root-finding method.

20. The computer program product of claim 19, wherein said numerical root-finding method is the Newton-Raphson method.

21. A computer program product for use in a system for determining the position of a user terminal in a satellite communications system, said computer program product comprising a computer usable medium having computer readable program code means embodied in said medium for causing an application program to execute on a computer, said computer readable program code means comprising:

- a first computer readable program code means for causing said computer to estimate the radius of the Earth at a user terminal position estimate to produce a coarse radius estimate;
- a second computer readable program code means for causing said computer to determine a first distance between the user terminal and a first satellite;
- a third computer readable program code means for causing said computer to determine a second distance between the user terminal and a second satellite;
- a fourth computer readable program code means for causing said computer to compute a coarse position estimate based on said coarse radius estimate, said first distance, and said second distance;
- a fifth computer readable program code means for causing said computer to update said coarse radius estimate using said coarse position estimate to produce a fine radius estimate; and
- a sixth computer readable program code means for causing said computer to update said coarse position estimate based on said fine radius estimate, said first distance, and said second distance to produce a fine position estimate for the user terminal.

22. The computer program product of claim 21, wherein said fifth computer readable program code means comprises a computer readable program code means for causing said computer to use a detailed Earth terrain model to estimate the radius of the Earth.

23. The computer program product of claim 21, further comprising a sixth computer readable program code means for causing said computer to iteratively improve said coarse position estimate using a numerical root-finding method.

24. The computer program product of claim 23, wherein said numerical root-finding method is the Newton-Raphson method.

* * * * *